United States Patent Office 2,912,421
Patented Nov. 10, 1959

2,912,421

POLYMERIZATION USING HYDROCARBON ALUMINUM AND SUPPORTED TITANIUM DIOXIDE CATALYSTS

Omar O. Juveland, South Holland, Ill., and Willard S. Higley, Hammond, Ind., assignors to Standard Oil Company, Chicago, Ill., a corporation of Indiana No Drawing. Application October 23, 1957
Serial No. 691,815

15 Claims. (Cl. 260—93.7)

This invention relates to a novel process for the preparation of especially effective catalysts suitable for olefin polymerization and the catalysts produced thereby. In another aspect, this invention is concerned with the polymerization of olefins, especially to produce normally solid, relatively crystalline polymers, by contacting charging stocks comprising said olefins with the aforesaid novel solid catalysts. Specifically, 1-alkenes, especially propylene, can be polymerized by the process of our invention to produce normally solid crystalline or isotactic polymers and in one variant of the process, the aforesaid polymerization can be conducted in a solvent for the polymer product at a high temperature sufficient substantially to maintain the polymer product in solution in said solvent at the polymerization temperature.

One object of our invention is to provide novel catalysts for olefin polymerization derived from $TiO_2$ prepared from specified precursors by a specified method. Another object of our invention is to provide olefin polymerization catalysts by the interaction of hydrocarbon aluminum compounds and supported $TiO_2$ prepared by a specified technique. An additional object of our invention is to provide a novel process for the polymerization of olefins. Yet another object is to provide a novel process for the polymerization of 1-olefins such as ethylene, propylene, butylene, etc. and diolefins such as butadiene and isoprene to produce solid polymers of high molecular weight. An additional object is to provide a process for the catalytic polymerization of propylene (which yields high molecular weight, relatively crystalline, high melting polymers) in solution in an inert liquid solvent at polymerization temperatures which are sufficiently high to dissolve solid polymer product, by the use of catalytic systems which exhibit high activity at said high temperatures. These and other objects of our invention will become apparent from the following description thereof.

According to the invention catalysts are produced by the interaction of a hydrocarbon aluminum compound and titania extended upon a solid supporting material which is not, per se, a catalyst for olefin polymerization under the reaction conditions employed in accordance with this invention, e.g. such supports as porous, difficulty reducible metal oxides such as silica gel; magnesia; relatively non-porous, high surface area silica; activated aluminas such as gamma alumina, activated clays or synthetic silica-alumina composites, etc. Suitable difficulty reducible metal oxides are those of metals of Groups 2, 3 and 4 of the Mendeleef Periodic Table. The catalyst supporting materials should have a surface area of at least about 100 square meters per gram (BET or similar method of measurement).

We have made the unexpected discovery that the method of preparing the supported titania catalyst greatly affects its catalytic properties in olefin polymerization, especially at high temperatures in excess of about 140° C., and that this fact and discovery can be of decisive importance in the design of specific olefin polymerization processes.

Briefly, the most desirable catalysts for olefin polymerization at high temperatures above 140° C. were found by us to be producible by the conversion of an organic ester of ortho-titanic acid, carried upon an inert catalyst support, to titania, followed by interaction with a hydrocarbon aluminum compound, as will be described in more detail hereinafter. The organic esters of orthotitanic acid will be referred to hereinafter simply as titanium esters, except when specific esters are involved. The supported titanium esters can be readily converted to supported titania by heating (calcination or roasting in air or the like) at high temperatures of at least about 200° C. Heating can be effected at about 200 to 600° C. Preferably about 300 to about 450° C. Alternatively, the supported titanium esters can be subjected to hydrolysis, dried, and then calcined or roasted to produce supported titania. We have found that supported inorganic titanium salts, for example titanium tetrachloride, can be calcined or roasted to form supported titania catalysts containing little or no inorganic ester residue, e.g. chlorine, but these catalysts, developed by further treatment with hydrocarbon aluminum compounds, exhibit substantially inferior catalytic properties to catalysts derived from titanium esters, especially at temperatures of at least 140° C.

In the following table are included examples of the use of catalysts prepared in accordance with our invention for the purpose of propylene polymerization and a comparison thereof with a catalyst derived from titanium tetrachloride.

TABLE 1

*Propylene polymerization*

[Titania-silica: $Al(iC_4H_9)_3$ catalysts.]

| Ex. | Metal Oxide | | | Polym. Temp., °C. | Polym. Rate, g./g./hr. | Percent Xylene Insoluble Polymer | Intrin. Visc. Insoluble Polymer |
|---|---|---|---|---|---|---|---|
| | Source | Percent on Support | Type | | | | |
| 1 | TBT[1] | 10 | $TiO_2$ | 120 | 1.4 | 54 | 8.2 |
| 2 | TBT | 10 | $TiO_2$ | 150 | 1.1 | 32 | 3.1 |
| 3 | TBT | 10 | $TiO_2$ | 170 | 1.0 | 32 | 2.1 |
| 4 | TBT | 10 | $TiO_2$—$H_2$ Red. | 170 | 0.9 | 41.5 | 3.5 |
| 5 | $TiCl_4$ | 10 | $TiO_2$ | 170 | 0.3 | 61 | 3.5 |

[1] Tetrabutyl titanate.

It is believed that the foregoing table is essentially self-explanatory. In Examples 1 to 4 the tetrabutyl titanate on the catalyst support was heated in air from 100° C. to 450° C. to convert it to $TiO_2$. The silica support was a commercial product having an average pore diameter of 140 A. (Davison Co., grade 70) and a particle size range between about 60 and about 200 mesh. The percentage of $TiO_2$ is percent by weight of total supported $TiO_2$. The $TiO_2$–$SiO_2$ derived from the $TiCl_4$ was prepared by heating an adsorbate of $TiCl_4$ on 140 A. silica at a temperature of 100° C. to 450° C. for 3 hours. In each instance, the supported $TiO_2$ was mixed in the presence of mineral spirits solvent at room temperature with triisobutyl aluminum in a molar ratio to $TiO_2$ found by past experience to be very suitable, vis. one. The mixture was then stirred and heated under an inert gas blanket from room temperature to the reaction temperature shown in the table and liquid propylene was then introduced into the reactor at the stated reaction temperature. In the table the polymerization reaction rate is given in grams of polymer per grams of catalyst per hour. The normally solid polypropylenes produced in these reactions were extracted and filtered from catalyst, dissolved in boiling xylenes and cooled to room temperature, whereupon the so-called xylenes-insoluble polymer precipitated and was separated from the xylenes solution of polypropylenes by decantation. The intrinsic viscosity of the xylenes-insoluble polymer obtained in the foregoing table was determined by measuring the viscosity of a solution of 0.2 g. of polypropylene in 100 cc. of decalin at 130° C.

It will be noted from Table I that polypropylenes of extremely high intrinsic viscosity (and therefore very high molecular weight) were produced by using TBT-derived catalysts at 120° C. and that increasing the reaction temperature to 150° C. (Example 2) and then to 170° C. (Example 3) resulted in successive decreases of the intrinsic viscosity and the stabilization of the concentration of xylenes-isoluble polymer between about 30 and 35% by weight of the total polymer. In Example 4 the supported titania catalyst was prereduced with hydrogen at 480° C. for 3 hours before treatment with triisobutyl aluminum, which resulted in a substantial increase in the concentration of xylenes-insoluble polymer in the product and (comparing Examples 4 and 3) a substantial increase in the intrisic viscosity of the polymer.

From Example 5 of Table I it will be noted that a catalyst prepared from $TiCl_4$ was relatively unsuitable for high temperature use because of the low polymerization rate of only 0.3 g. solid polymer per hour per gram of catalyst, as compared with the much higher rates derived from the use of catalyst based upon tetrabutyl titanate.

The details of the polymerization runs of Table I are presented in Table II.

Tables I and II, except as indicated; these departures are clear, simple and self-explanatory.

Run 1.—Three grams of 10 wt. percent $TiO_2$—$SiO_2$ prepared by impregnating silica gel with tetrabutyl titanate were calcined in air for 7 hours at a maximum temperature of 450° C. The $TiO_2$—$SiO_2$ was cooled under nitrogen gas to near room temperature. The $TiO_2$—$SiO_2$ was then added to 70 cc. of highly purified mineral spirits, contained in a dry 3-neck, 500 cc. round bottom flask through which a steady flow of dry nitrogen was maintained. Triisobutyl aluminum (1.485 g.) was added to the $TiO_2$—$SiO_2$ solvent mixture and was allowed to react, with intermittent stirring for 0.5 hour. Most of the solvent was then removed from the catalyst and fresh solvent was added with stirring to wash the excess triisobutyl aluminum from the catalyst. The catalyst was washed in this manner with two 40 cc. portions of fresh solvent. The catalyst was then transferred to a dry 300 cc. rocking steel autoclave with additional fresh solvent under nitrogen. About 80 cc. of solvent remained with the catalyst in the autoclave. The solvent from the catalyst washing operations was analyzed for the total amount of triisobutyl aluminum removed. The autoclave was then sealed under nitrogen and heated with rocking over a 20 minute period to reaction temperature. Liquid propylene (60 g.) was pressured into the reactor. The reaction temperature was maintained at 120° C. and rocking was continued at this temperature for 2 hours, after which time the run was discontinued and the excess propylene was vented after 10 minutes cooling. The autoclave was opened and the contents were removed. Three liters of boiling xylene were added to the polymer-catalyst mixture containing 0.5 g. of oxidation inhibitor (2,6-di-tert. butyl-4-methylphenol) and the boiling xylene solution was passed through filter paper. The remaining catalyst was again treated with 1.5 liters of boiling stabilized xylene to effect nearly complete removal of polymer. The combined filtrate was cooled to room temperature overnight. The precipitated polymer was separated from the soluble polymer by filtration. The insoluble polymer on the filter was washed with cold xylene. The washed polymer was transferred to a Waring Blendor and extracted with acetone to remove xylene. The acetone-washed polymer was then dried overnight in a

TABLE II

| Example No. | 1 | 2 | 3 | 4 | 5 |
|---|---|---|---|---|---|
| Catalyst: | | | | | |
| Metal Oxide | $TiO_2$ | $TiO_2$ | $TiO_2$ | $TiO_2$ | $TiO_2$ |
| Wt. Percent | 10 | 10 | 10 | 10 | 10 |
| Support | $SiO_2$ | $SiO_2$ | $SiO_2$ | $SiO_2$ | $SiO_2$ |
| Impregnation | a TBT | TBT | TBT | TBT | $TiCl_4$ |
| $Al(iC_4H_9)_3/TiO_2$ Molar Ratio | b 1:1 | 0.83 | 1:1 | 1:1 | 1:1 |
| $TiO_2$—$SiO_2$ Activation: | | | | | |
| Gas | air | air | air | air, $H_2$ | air |
| Temp., °C | 450 | 450 | 450 | 450, 480 | 450 |
| Time, hrs | 7 | 1 | 1 | 4, 3 | 25 |
| Polymerization Conditions: | | | | | |
| $TiO_2$—$SiO_2$, g | 3.0 | 3.0 | 3.0 | 3.0 | 3.0 |
| Mineral Spirits Solvent, c cc | 80 | 70 | 70 | 70 | 70 |
| Propylene, g | 60 | 60 | 71 | 60 | 58 |
| Reaction Temp., °C | 120 | 150 | 170 | 170 | 170 |
| Reaction Time, hrs | 2.0 | 2.0 | 2.0 | 2.0 | 1.83 |
| Products: | | | | | |
| Xylenes-Soluble Polypropylene, g | 3.8 | 4.4 | 4.3 | 3.1 | 0.7 |
| Xylenes-Insol. Polypropylene, g | 4.5 | 2.1 | 2.0 | 2.2 | 1.1 |
| Total polypropylene, g | 8.3 | 6.5 | 6.3 | 5.3 | 1.8 |
| g. Total polymer/g. cat./hr | 1.4 | 1.1 | 1.05 | 0.9 | 0.33 |
| Wt. Percent Insol. Polymer | 54 | 32 | 32 | 41.5 | 61 |
| Phys. Props. of Polymers: | | | | | |
| Xylenes-Insoluble polymer— | | | | | |
| Density (24° C.) | 0.9013 | | 0.9022 | 0.9023 | 0.9125 |
| Intrinsic visc | 8.2 | | 2.14 | 3.45 | 3.50 |
| Xylenes-Soluble polymer—Intrinsic visc | 2.68 | 1.35 | | 1.25 | 1.47 | a Tetrabutyl titanate.
b Backwash technique.
c A saturated naphtha fraction.

The following is a detailed description of how run 1 was carried out, so that it can be reproduced by those skilled in the art. No substantial procedural departure from run 1 was made in the other runs set forth in vacuum oven at 80° C. under a nitrogen atmosphere. The xylene-soluble portion of the polypropylene was isolated by concentrating the xylene filtrate to about 1/10 volume and pouring it into 2 liters of acetone. The precipitated xylene-soluble polymer was then separated from acetone and dried at 80° C. under nitrogen. The dried, xylene-insoluble polymer weighed 4.5 g.; $d$ (23° C.) was 0.9013 and intrinsic viscosity was 8.23. The xylene-soluble polypropylene weighed 3.8 g.; intrinsic viscosity, 2.68.

In the other runs, not using the back wash technique, the solvent was added to the autoclave first. The triisobutyl aluminum was added next, followed by the $TiO_2$—$SiO_2$, which was cooled under nitrogen prior to addition.

The polymerization runs of Table III were carried out with a catalyst of 10% by weight of $TiO_2$ on silica gel, prepared by the following procedure:

To 49 g. of commercial silica gel (Davison Co., grade 70) having an average pore diameter of 140 A. were added 18.1 g. of a solution of tetrabutyl titanate in 100 cc. of benzene and the mixture was blown with nitrogen until it was dry. A white solid material was the product of this stage of operation. Except in the one instance indicated in the table, the white solid was heated directly in air in a muffle furnace at a temperature between about 100 and about 450° C. at atmospheric pressure for one hour. In the exceptional case indicated in the table, the white solid was first treated with aqueous ammonia and then calcined as before.

The polymerization runs of Table III were carried out at 170° C., propylene being added only after this temperature had been reached in the first four runs, but added at room temperature in the last run of Table III.

The propylene was a commercial C.P. product. The polymerization runs were effected in rocking autoclaves having capacities of 183 or 300 cc. and these were charged with catalysts and reactants under a blanket of nitrogen gas. The specific viscosities were determined upon solutions of 0.2 g. of polymer per 100 ml. Decalin at 130° C.

pressure was maintained at 600–900 p.s.i.g. for 5 hours. At the end of this time, the bomb was cooled and the ethylene vented. Approximately 40 g. of a white, high molecular weight polyethylene was obtained.

The butadiene polymerization was carried out as follows:

*Example 12.*—To a 100 cc. round bottom flask were added 50.0 cc. of cyclohexane, 0.23 g. of Al(isobutyl)$_3$, and 1.03 g. of 10 wt. percent $TiO_2$ on $SiO_2$. Butadiene was pressured in to about 10 p.s.i.g. and heating was begun to 100° C. Then an additional 1.0 g. of Al(isobutyl)$_3$ was added, butadiene was repressured to 10 p.s.i.g. and heating begun to 75° C. Operation for 3 hours at 75° C. gave a rubbery polybutadiene.

It will be understood that the foregoing examples are merely illustrative of invention and should not be construed as undue limitations of its broader aspects.

Organic esters of orthotitanic acid, as a generic class, can be employed for the purposes of this invention. The organic radicals in the titanium esters can all be the same or two or more different organic radicals can be present. We can employ alkyl, aryl, cycloalkyl, alkaryl, aralkyl, alkenyl and alkynyl derivatives or orthotitanic acid; mixtures of symmetrical titanium esters; unsymmetrical titanium esters, etc. as will be obvious to one skilled in the art and informed of the present disclosure. We can also employ substituted titanium esters, such as chloroalkyl esters or other halogen-substituted, hydroxy-substituted or alkoxy-substituted alkyl or aryl esters of orthotitanic acid and the like.

Examples of alkyl titanates which can be used include such symmetrical esters as methyl, ethyl, n-propyl, isopropyl, n-butyl, isobutyl, t-butyl, n-amyl, isoamyl, heptyl, octyl, nonyl, decyl, dodecyl, hexadecyl, octadecyl and similar esters of orthotitanic acid.

Cycloalkyl esters of orthotitanic acid include cyclo-

TABLE III

*Polymerization of propylene over 10% $TiO_2$(TBT)—$SiO_2$ at 170° C.*

| Run No | 6 | 7 | 8 | 9 | 10 [c] |
|---|---|---|---|---|---|
| $TiO_2$—$SiO_2$, g | 3.0 | 3.0 | 3.0 | 3.0 | 6.14 |
| Triisobutyl Aluminum, mols | 0.00375 | 0.0045 | 0.003 | 0.00225 | 0.0059 |
| Mol Ratio—$AlR_3$ to $TiO_2$ | 1.0 | 1.2 | 0.8 | 0.6 | 0.65 |
| Catalyst Preforming Conditions: [a] | | | | | |
| Temp., °C | 25–170 | 25–170 | 25–170 | 25–170 | none |
| Time, min | 30 | 30 | 30 | 30 | none |
| Propylene, g | 71.0 | 71.0 | 71.0 | 71.0 | 74 |
| Mineral Spirits Solvent, cc.[b] | 70 | 70 | 70 | 70 | 50 |
| Polymerization Conditions: | | | | | |
| Temp., °C | 170 | 170 | 170 | 170 | 25–170 |
| Press. Range, p.s.i | 1,045–1,400 | | 980–1,110 | | 225–1,170 |
| Press. Drop, p.s.i | 255 | | 130 | | |
| Time, hrs | 2.0 | 2.0 | 2.0 | 2.0 | 14 |
| Products, g.: | | | | | |
| Oils and Greases | | | 0.76 | 0.77 | 1.8 |
| Xylenes Soluble Polymer | 4.3 | 2.2 | 3.3 | 3.3 | 13.7 |
| Xylenes Insol. Polymer | 2.0 | 1.3 | 0.95 | 1.3 | 7.0 |
| Total Solid Polymer | 6.3 | 3.5 | 4.25 | 4.6 | 20.7 |
| Wt. Percent Insol. Polymer | 32 | 37 | 23 | 28 | 34 |
| g. Total Solid Polymer/g. Cat | 2.15 | 1.17 | 2.1 | 2.3 | 3.4 |
| Physical Properties: | | | | | |
| Xylene Insol. Polymer—$d$ (23° C.) | 0.9022 | 0.9050 | 0.9035 | 0.9019 | 0.9033 |
| Specific Viscosity | 0.502 | 0.498 | 0.525 | 0.690 | 0.410 |
| Xylene Soluble Polymer—Specific Viscosity | | | 0.202 | 0.221 | 0.110 |

[a] Catalyst prepared in absence of olefin.
[b] Mixture of saturated hydrocarbons; B.R. about 170–190° C.
[c] Catalyst hydrolyzed with aqueous ammonia before calcination.

*Example 11.*—To a 300 cc. rocker bomb were added 70 cc. of mineral spirits, 0.63 g. of Al(isobutyl)$_3$ in 2.5 cc. of mineral spirits, and 2.95 g. of 10 wt. percent $TiO_2$ on $SiO_2$. The $TiO_2$–$SiO_2$ catalyst was prepared by depositing tetrabutyl titanate on $SiO_2$ and calcining for 1 hour at 450° C. The bomb contents were heated to 100° C. in 0.5 hour in the absence of ethylene. Ethylene was then added to 900 p.s.i.g. At this point, the temperature rose to 113° C. After about 0.5 hour, the reaction temperature fell to 100° C. Ethylene pentyl, methyl cyclopentyl, cyclohexyl, methylcyclohexyl, cyclooctyl and similar esters of orthotitanic acid.

Examples of aryl and alkaryl orthotitanates include phenyl cresyl, xylenyl, nonyl-phenyl, decyl-phenyl, dodecyl-phenyl and similar esters of orthotitanic acid.

Exampes of unsymmetrical esters of orthotitanic acid include phenyl triethyl, phenyl tripropyl, phenyl tributyl and similar esters of orthotitanic acid.

Glycol esters of orthotitanic acid can be used, or mixed alcohol-glycol esters or alkoxy-glycol esters. Thus, we can use octylene glycol titanates, in which the titanium atom displays its maximum coordination number of six:

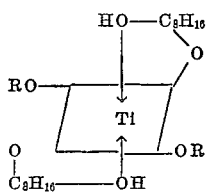

wherein R is an alkyl group, and similar compounds.

Also, one of the hydroxy groups of the orthotitanic acid can be replaced by an acyloxy group.

In order to prepare an active olefin polymerization catalyst from the supported titania it is necessary to effect reaction thereof with a reactive hydrocarbon aluminum compound. For the purposes of our invention, a hydrocarbon aluminum compound contains at least one monovalent hydrocarbon radical bonded to an aluminum atom.

Suitable hydrocarbon aluminum compounds have the general formula $R_nAlX_m$, wherein R represents a monovalent hydrocarbon radical, X is selected from the group consisting of hydrogen, halogen and oxyhydrocarbon (i.e. OR, wherein R is a monovalent hydrocarbon radical), $n$ is an integer having a value of 1 to 3, inclusive, $m$ is zero or an integer and the sum of $m$ and $n$ is 3. Preferred halogen radicals are the middle halogens, viz. chlorine and bromine.

For the purposes of our invention, we can employ trihydrocarbon aluminum such as trialkyl aluminums, triaryl aluminums, dialkyl aluminum hydrides, and the so-called aluminum sesquihalides including dialkyl aluminum halides, i.g. dimethyl aluminum iodide, dipropyl aluminum bromide, dibutyl aluminum chloride, their mixtures and the like.

The R groups in the aluminum compound may be the same or different monovalent hydrocarbon radicals. Examples of suitable R groups include an aryl radical, aliphatic hydrocarbon radical or derivative, such as alkyl, cycloalkyl-alkyl, cycloalkenyl-alkyl, aryl-alkyl, cycloalkyl, alkyl-cycloalkyl, aryl-cycloalkyl, cycloalkyl-alkenyl, alkyl-aryl or cycloalkyl-aryl radicals.

Specific examples of R groups for substitution in the above formula ($R_nAlX_m$) include methyl, ethyl, n-propyl, isopropyl, isobutyl, n-amyl, isoamyl, hexyl, n-octyl, n-dodecyl, and the like; 2-butenyl, 2-methyl-2-butenyl and the like; cyclopentyl-methyl, cyclohexyl-ethyl, cyclopentyl-ethyl, methylcyclopentyl-ethyl, 4-cyclohexenylethyl and the like; 2-phenylethyl, 2-phenylpropyl, β-naphthylethyl, methylnaphthylethyl and the like; cyclopentyl, cyclohexyl, 2,2,1-bicycloheptyl and the like; methylcyclopentyl, dimethylcyclopentyl, ethylcyclopentyl, methylcyclohexyl, dimethylcyclohexyl, ethylcyclohexyl, isopropylcyclohexyl, 5-cyclopentadienyl and the like; phenylcyclopentyl, phenylcyclohexyl, the corresponding naphthyl derivatives of cycloalkyl groups, and the like; phenyl, tolyl, xylyl, ethylphenyl, xenyl, naphthyl, methylnaphthyl, dimethylnaphthyl, ethylnaphthyl, cyclohexylphenyl and other $AlR_3$ compounds of the type disclosed and suggested in German Patent 878,560.

The hydrocarbon aluminum compounds can be employed as such or as reactive complex compounds, e.g., alkali metal aluminum alkyls, e.g. lithium aluminum tetrapropyl, lithium aluminum tetrabutyl, lithium aluminum tetraheptyl, sodium aluminum tetrabutyl or the like, or mixtures of hydrocarbon aluminum compounds such as trialkyl aluminum with complex aluminum compound.

In preparing catalysts from the present invention by the interaction of hydrocarbon aluminum compounds and supported titania, we have observed that the yields of polymer per gram of catalyst can be influenced by variation in the molar ratio of hydrocarbon aluminum compound to the titania component of the supported titania. In general, the molar ratio of hydrocarbon aluminum compound to titania can be varied from 0.1 to as much as 10, although usually we employ molar ratios in the range of about 0.5 to about 5 and preferably about 1 when well-purified solvents and olefins are employed as charging stocks in the polymerization process of the present invention.

A variety of techniques are available for the interaction of the supported titania with the hydrocarbon aluminum compound, which interaction can be effected in the presence or absence of the olefin feed stock. Preferably, although not invariably, the supported titania and hydrocarbon aluminum compound are allowed to react in the presence of an inert liquid medium, which may be a hydrocarbon such as an alkane, cycloalkane, aromatic hydrocarbon, a naphtha fraction or the like or substantially inert hydrocarbon derivative such as certain halogenated hydrocarbon solvents, viz. chlorobenzene, orthodichlorobenzene, their mixtures or the like. The desired interaction can be effected at temperatures of 0° C. or even lower and the selected olefin polymerization temperature, with thorough contacting of the supported titania and hydrocarbon aluminum compound. When a solution of the aluminum compound in a liquid solvent is employed, e.g. a solution of triisobutyl aluminum in mineral spirits, the supported titania catalyst can be added thereto in increments, with stirring, under an inert gas atmosphere such as nitrogen, helium or argon, preferably in the absence of the olefin polymerization feed stock. Alternatively, the hydrocarbon aluminum compound solution can be added in an inert atmosphere to a powder of the supported titania with stirring.

One desirable technique requires contacting more than one mol of hydrocarbon aluminum compound in solution in an inert liquid solvent with one mol of titania carried on an inert support, withdrawing excess solution and washing the solid catalyst with a solvent such as an unreactive hydrocarbon liquid to remove unreacted hydrocarbon aluminum compound from the catalyst prior to contacting the catalyst with the olefin polymerization feed stock. In a further alternative method of operation, the supported titania, hydrocarbon aluminum compound and olefin polymerization feed stock are added to the polymerization reactor substantially simultaneously and the reactor contents are thoroughly agitated and maintained at the desired polymerization temperature.

The olefin polymerization feed stocks may be charged to the polymerization zone, as the case may be, as gas, vapor, liquid or solution in an inert liquid solvent, for example a saturated or aromatic hydrocarbon or mixture thereof.

It is desirable to minimize the concentration of catalyst-reactive elements or compounds in the polymerization zone and in the materials charged thereto, for example, such impurities as oxygen, water, sulfur or sulfur compounds, acetylene, methyl acetylene, allene, carbon dioxide and the like. The polymerization feed stocks can contain saturated hydrocarbon diluents.

Suitable feed stocks for polymerization are olefins generally and especially terminal vinyl olefins conforming to the general formula $RCH=CH_2$, wherein R is hydrogen or a hydrocarbon radical. The hydrocarbon radical (R) can be an alkyl radical, e.g. methyl, ethyl, propyl, butyl, isopropyl, isobutyl, neopentyl, hexyl, octyl or the like. The radical R can also be an unsaturated radical such as vinyl, propenyl, isopropenyl (as in isoprene), acetylenyl or the like. The R radical can also be cycloalkyl such as cyclopropyl, cyclobutyl, cyclohexyl, methylcyclopentyl, methylcyclohexyl or the like. The R radical can also be aryl such as phenyl, tolyl, ethylphenyl, naphthyl or the like. The olefin can be norbornylene or the like, or mixtures thereof with ethylene or propylene.

We prefer to use olefin polymerization feed stocks which are terminal vinyl olefins having the formula $RCH=CH_2$ wherein R is hydrogen or an alkyl or isoalkyl radical, for example, ethylene, propylene, 1-butene, 3-methyl-1-butene, 1-pentene, 4-methylpentene or their mixtures, or the like.

Rubber-like products can be produced by the polymerization of the preferred terminal vinyl olefins and about 1 to 50 weight percent thereof of a conjugated diene such as 1,3-butadiene, isoprene, paradivinylbenzene, piperylene or their mixtures, or the like.

The invention can also be applied to mixtures of alkenes, for example ethylene-propylene mixtures or the like, of widely variant concentration range (about 5 to 95 volume percent) with respect to either alkene component. Ternary olefin mixtures can also be processed by the method of this invention.

In its preferred form, the polymerization process of the present invention is carried out by contacting the catalyst with a solution of the olefin feed stock in an inert liquid solvent. The concentration of olefin in the solution can be varied from about 1 to about 25% by weight of the solution, being usually in the range of about 3 to about 10 weight percent. We use at least 5, preferably at least 10 parts by weight of solvent per part by weight of normally solid polymer product and can use a ratio of solvent to solid polymer up to about 100.

Various classes of inert hydrocarbons can be employed as polymerization solvents, for example alkanes, cycloalkanes, aromatic hydrocarbons and liquid olefins such as diisobutylene, etc. and the like.

Suitable alkane solvents, which can be used individually or dissolved in mixtures, include propane, butane, isobutane, pentane, isopentane, hexanes, heptane, octane, 2,2,4-trimethylpentane, commercial "isooctane," nonanes, decanes, dodecanes; naphtha or kerosene fractions which have been treated to remove alkenes and aromatic hydrocarbons, white oils and the like.

Suitable cycloalkane solvents, which can be used individually or in mixtures, include cyclopentane, methylcyclopentane, dimethylcyclopentane, cyclohexane, methylcyclohexane, dimethylcyclohexane, ethylcyclohexane and the like.

Suitable aromatic hydrocarbon solvents, which can be used individually or in mixtures as polymerization reaction solvents, include benzene, toluene, xylenes, ethylbenzene, propylbenzene, cumene, t-butylbenzene, trimethylbenzenes or the like.

The liquid solvent can function to dissolve olefin feed stock, to slurry or suspend the solid catalyst, to dissolve all or a fraction of the polymerization products and to transport materials and products into and out of the reactor in a continuous polymerization process.

The polymerization temperature will necessarily be selected with reference to the specific feed stock, the precise catalyst composition, and other reaction variables, as well as the nature of the product which is sought, as will be appreciated by one skilled in the art of polymerization. In general, the polymerization temperature is selected within the range of about 15° C. to about 350° C., more often about 90° C. to about 225° C. A special and unexpected advantage of the polymerization catalysts of our invention is their applicability, without substantial loss of polymerization activity, at high temperatures above about 140° C., e.g. about 150 to 180° C., for the polymerization of normal 1-alkenes such as propylene, thereby retaining a substantial proportion of the normally solid polymer product in solution in the solvent.

The pressure which is maintained in the polymerization reactor can range from about one atmosphere to 5000 p.s.i.g. or even 20,000 p.s.i.g., being, in general, limited only by the pressure-resistance of the reactor and associated equipment. By adjustment of the temperature, pressure and type and amount of solvent medium in the polymerization reactor, it is possible to control the physical state of the olefin polymerization feed stock so that it is in the condition of a vapor, gas or solution in the solvent medium. With olefin polymerization feed stocks such as ethylene, propylene and/or butadiene, in the presence of a hydrocarbon liquid solvent such as heptane or mineral spirits, temperatures in the range of about 90° C. to about 250° C., preferably 150 to 180° C., and pressures between about 300 and about 1500 p.s.i.g. can be correlated to provide suitable solutions of the feed stock in the hydrocarbon liquid medium and to permit the removal of normally solid polymers from the reaction zone in solution in the liquid solvent.

While olefin polymerization feed stocks are preferably polymerized in the liquid condition or as a solution in a suitable solvent, polymerization can also be conducted with the olefin in the vapor or gaseous condition in suitable reaction equipment which is per se well known in the are of chemical engineering.

In liquid phase or solution polymerization the heterogeneous solid catalyst can be employed as a fixed bed, slurry or expanded settling bed and catalyst can be withdrawn intermittently or continuously or extracted with hot solvent to remove occluded polymerization products before recycle of used catalyst to the polymerization zone. In gaseous or vapor phase polymerization processes, one can employ fixed or fluidized beds of catalysts in which the supported titania has been pretreated with a hydrocarbon aluminum compound or into which the hydrocarbon aluminum compound is introduced directly or with the olefin polymerization feed stock.

Polymerization of propylene by the process of the present invention yields oils, amorphous (atactic) normally solid polymers and crystalline (isotactic) polypropylenes having sharp X-ray diffraction patterns and crystalline melting points in the range of about 140 to about 175° C. and specific viscosities (determined with 0.2 g. of polypropylene dissolved in 100 ml. Decalin at 130° C.) of at least 0.4. Stereoblock polypropylenes may also be produced. From ethylene, the process of the present invention yields oils, waxes and resinous, normally solid polymers having specific viscosities (by the method aforesaid) of at least 0.2 and extending to 3 or even more, and crystalline melting points up to about 135° C. Ethylenepropylene copolymers produced by the process of this invention are plastic, resinous materials of high molecular weight, having properties in the range of crystalline resins to valuable synthetic elastomers. When the processes of the present invention are applied to mixtures of 1-alkene and a conjugated diene, the products include rubber-like polymers which are vulcanizable by conventional techniques.

The normally solid polymers produced by the process of this invention can be subjected to various treatments to effect desirable changes or improvements in properties, e.g. milling, orientation or cold drawing in one or two directions, incorporation of various fillers, antioxidants, plasticizers coloring materials carbon black finely powdered non-porous silica and other normally solid hydrocarbons or hydrocarbon polymers etc. Additional materials may be added to the normally solid polymer product by milling therewith or by incorporation in a solution of polymer in a suitable liquid solvent.

The normally solid polymers produced by the process of this invention can be subjected to high energy radiation in the range of about 0.5 to 3 mev. or can be irradiated with ultra-violet light in the range of about 200 to 350 millimicrons preferably in the presence of activators such as benzophenone, diphenylamine, phenyl disulfide, etc. The normally solid polymer produced by the process of this invention can also be subjected to chlorination or sulfochlorination by known techniques.

Having thus described our invention, what we claim is:

1. A process for the polymerization of an olefin which comprises contacting said olefin under polymerization conditions with a catalyst prepared by contacting a hydrocarbon aluminum compound with a solid material consisting essentially of a minor proportion by weight of $TiO_2$ extended upon a major proportion by weight of an inert solid support, said $TiO_2$ being prepared by a process which comprises coating said support with an organic ester of orthotitanic acid and heating the coated support at a temperature of at least about 200° C.

2. The process of claim 1 wherein said $TiO_2$ is prepared by hydrolysis of said ester on said coated support, followed by heating at a temperature of at least about 200° C.

3. The process of claim 1 wherein said support is a difficultly reducible metal oxide having a surface area of at least about 100 square meters per gram.

4. The process of claim 1 wherein said olefin is a 1-alkene.

5. A process for the polymerization of a normal 1-alkene in a solvent at an elevated temperature sufficient to maintain a substantial proportion of a normally solid polymer of said 1-alkene produced by said process in solution in said solvent, which process comprises contacting said normal 1-alkene and said solvent at a temperature between about 150° C. and about 180° C. with a catalyst prepared by contacting a hydrocarbon aluminum compound with a solid material consisting essentially of $TiO_2$ extended upon an inert solid support, said $TiO_2$ being prepared by a process which comprises coating said support with an organic ester of orthotitanic acid and heating the coated support at a temperature of at least about 200° C.

6. The process of claim 5 wherein said 1-alkene is propylene.

7. The process of claim 5 wherein said 1-alkene is 1-butene.

8. The process of claim 5 wherein said support is silica.

9. The process of claim 5 wherein said support is an activated alumina.

10. The process of claim 5 wherein said hydrocarbon aluminum compound is a trihydrocarbon aluminum and the molar ratio of said aluminum compound to $TiO_2$ is between about 0.5 and about 5.

11. A catalyst exhibiting high olefin polymerization activity at elevated temperatures exceeding 150° C., which catalyst is prepared by the process which comprises contacting a hydrocarbon aluminum compound with a solid material consisting essentially of a minor proportion by weight of $TiO_2$ extending upon a major proportion by weight of an inert solid support, said $TiO_2$ being prepared by a process which comprises coating said support with an organic ester of orthotitanic acid and heating the coated support at a temperature of at least about 200° C.

12. The catalyst of claim 11 wherein said support is a difficultly reducible metal oxide having a surface area of at least about 100 square meters per gram.

13. The catalyst of claim 11 wherein said hydrocarbon aluminum compound is a trihydrocarbon aluminum and the molar ratio of said aluminum compound to $TiO_2$ is between about 0.5 and about 5.

14. The process of claim 13 wherein said aluminum compound is triisobutyl aluminum, the organic ester of orthotitanic acid is tetrabutyl titanate and said support is silica.

15. The catalyst of claim 14 wherein said molar ratio is about one.

References Cited in the file of this patent

UNITED STATES PATENTS

| | | |
|---|---|---|
| 2,768,907 | Lusby | Oct. 30, 1956 |
| 2,824,089 | Peters et al. | Feb. 18, 1958 |

FOREIGN PATENTS

| | | |
|---|---|---|
| 533,362 | Belgium | May 16, 1955 |